United States Patent
Mullins

(10) Patent No.: US 10,843,686 B2
(45) Date of Patent: Nov. 24, 2020

(54) AUGMENTED REALITY (AR) VISUALIZATION OF ADVANCED DRIVER-ASSISTANCE SYSTEM

(71) Applicant: Envisics Ltd, Knowlhill (GB)

(72) Inventor: Brian Mullins, Altadena, CA (US)

(73) Assignee: Envisics Ltd, Knowlhill (GB)

( * ) Notice: Subject to any disclaimer, the term of this patent is extended or adjusted under 35 U.S.C. 154(b) by 0 days.

(21) Appl. No.: 15/617,941

(22) Filed: Jun. 8, 2017

(65) Prior Publication Data

US 2018/0354509 A1 Dec. 13, 2018

(51) Int. Cl.
*B60W 30/09* (2012.01)
*G06T 11/60* (2006.01)
*B60W 50/14* (2020.01)
*G02B 27/01* (2006.01)

(52) U.S. Cl.
CPC ............ *B60W 30/09* (2013.01); *B60W 50/14* (2013.01); *G02B 27/01* (2013.01); *G06T 11/60* (2013.01); *B60W 2050/146* (2013.01); *G02B 27/0101* (2013.01); *G02B 2027/014* (2013.01); *G02B 2027/0138* (2013.01); *G02B 2027/0141* (2013.01)

(58) Field of Classification Search
CPC ................. B60W 30/09; B60W 50/14; B60W 2050/146; G02B 27/0101; G02B 2027/0141; G02B 2027/014; G06T 11/60
See application file for complete search history.

(56) References Cited

U.S. PATENT DOCUMENTS

| 5,949,331 | A  | * | 9/1999  | Schofield | B60N 2/002 340/461 |
| 2005/0278098 | A1 | * | 12/2005 | Breed | B60R 21/0134 701/45 |
| 2009/0309970 | A1 | * | 12/2009 | Ishii | B60R 1/00 348/143 |
| 2011/0054783 | A1 | * | 3/2011  | Kishikawa | G01C 21/3632 701/533 |
| 2014/0240115 | A1 | * | 8/2014  | Igarashi | B60W 30/08 340/435 |

(Continued)

*Primary Examiner* — Hunter B Lonsberry
*Assistant Examiner* — Daniel L Greene
(74) *Attorney, Agent, or Firm* — McDonnell Boehnen Hulbert & Berghoff LLP

(57) ABSTRACT

Disclosed are systems, methods, and non-transitory computer-readable media for presenting an Augmented Reality (AR) visualization of an Advanced Driver Assistance System (ADAS). A viewing device integrated into a vehicle gathers sensor data from one or more sensors. The sensor data describes a speed and trajectory of the vehicle and a geographic location of a physical object in relation to the vehicle. The viewing device determines, based on the sensor data, that a threat level of the vehicle colliding with the physical object meets or exceeds a threshold threat level. In response to determining that the threat level of the vehicle colliding with the physical object meets or exceeds the threshold threat level, the viewing device determines an automated movement of the vehicle to avoid colliding with the physical object. The viewing device then presents, on a heads up display of the vehicle, virtual content depicting the automated movement, and executes the automated movement.

17 Claims, 9 Drawing Sheets

(56) References Cited

U.S. PATENT DOCUMENTS

| | | | | |
|---|---|---|---|---|
| 2015/0284001 A1* | 10/2015 | Watanabe | ............... | H04N 7/18 |
| | | | | 701/36 |
| 2016/0375767 A1* | 12/2016 | Konet | .................... | B60K 35/00 |
| | | | | 701/23 |
| 2017/0039084 A1* | 2/2017 | Atsmon | .............. | G06F 9/45558 |
| 2017/0066450 A1* | 3/2017 | Ko | .................... | B60W 50/0098 |
| 2017/0200308 A1* | 7/2017 | Nguyen | ................ | G06T 15/005 |
| 2017/0208292 A1* | 7/2017 | Smits | .................... | H04N 7/147 |

* cited by examiner

(12) United States Patent
US 10,843,686 B2

AUGMENTED REALITY (AR) VISUALIZATION OF ADVANCED DRIVER-ASSISTANCE SYSTEM

TECHNICAL FIELD

The subject matter disclosed herein generally relates to presenting virtual content to augment reality. Specifically, the present disclosure addresses systems and methods for presenting an AR visualization of an Advanced Driver-Assistance System (ADAS).

BACKGROUND

Advanced driver-assistance systems (ADAS) automate, adapt and enhance vehicle systems for safety and improved driving. Safety features are designed to avoid collisions and accidents by offering technologies that alert the driver to potential problems, or to avoid collisions by implementing safeguards and taking over control of the vehicle. While an ADAS taking over control of the vehicle can successfully avoid a collision or other potential danger, the unexpected movement may frighten passengers. Accordingly, improvements are needed.

BRIEF DESCRIPTION OF THE SEVERAL VIEWS OF THE DRAWINGS

Example methods and systems for presenting an AR visualization of ADAS are disclosed. In the following description, for purposes of explanation, numerous specific details are set forth in order to provide a thorough understanding of example embodiments. It will be evident, however, to one skilled in the art that the present embodiments can be practiced without these specific details.

DETAILED DESCRIPTION

Example methods and systems are directed to presenting an AR visualization of ADAS. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality (AR) allows a user to augment reality with virtual content. Virtual content can be presented on a transparent display of a viewing device to augment the user's real world environment. As an example, virtual content presented on a heads up display (HUD) in an automobile can present the user with arrows or other indicators that provide the user with directions to a desired destination.

In addition to presenting the user with virtual content that aides the user in operating the vehicle to a desired destination, AR can also present the user with AR content warning the user of upcoming automated movements of the vehicle. An ADAS is configured to avoid collisions by implementing safeguards and taking over control of the vehicle. While an ADAS taking over control of the vehicle can successfully avoid a collision or other potential danger, the unexpected movement may frighten passengers. Accordingly, AR can be utilized to a present virtual content that alerts a user of an upcoming automated movement of the vehicle.

A viewing device integrated into a vehicle can provide AR and ADAS functionality. For example, the viewing device gathers sensor data that describes the speed and trajectory of the vehicle, as well as the geographic location of physical objects in relation to the physical object. The viewing device uses the sensor data to determine a threat level of the vehicle colliding with a physical object. In the event that the threat level meets or exceeds a threshold threat level, the viewing device determines an automated movement of the vehicle to avoid colliding with the physical object. The viewing device presents, on a HUD of the vehicle (or in a display of the viewing device), virtual content depicting the planned? automated movement. After displaying the planned automated movement in the HUD, the vehicle executes the automated movement. Presenting virtual content depicting the automated movement prior to execution of the automated movement, warns users in the vehicle of the upcoming automated movement.

Figure 1:
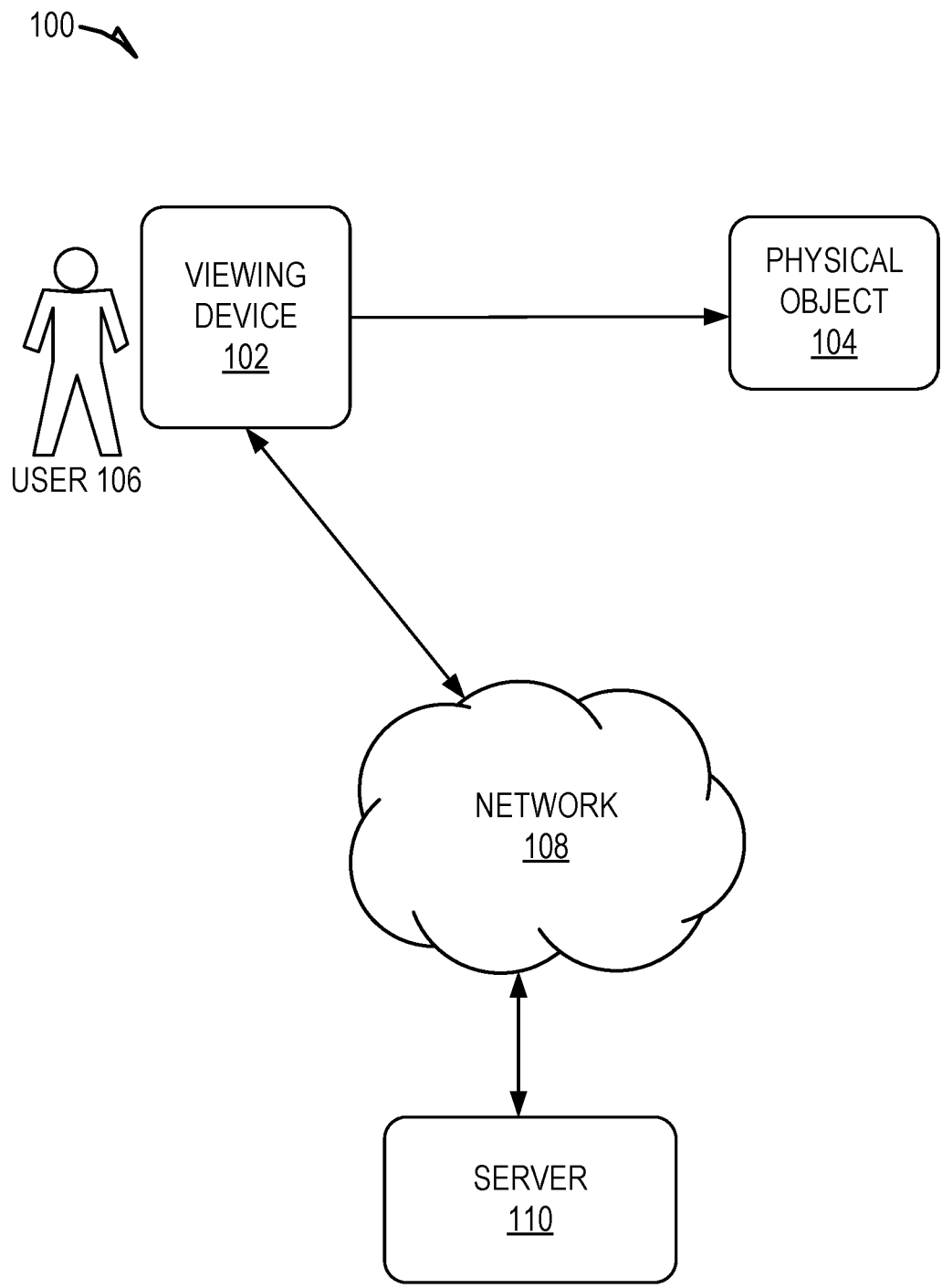
FIG. 1 is a block diagram illustrating an example of a network environment suitable for presenting virtual content to augment a user's reality, according to some example embodiments.

FIG. 1 is a block diagram illustrating an example of a network environment suitable for presenting virtual content to augment a user's reality, according to some example embodiments. The network environment 100 includes a viewing device 102 and a server 110, communicatively coupled to each other via a network 108. The viewing device 102 and the server 110 may each be implemented in a computer system, in whole or in part, as described below with respect to FIG. 9.

The server 110 may be part of a network-based system. For example, the network-based system may be or include a cloud-based server system that provides additional information, such as three-dimensional (3D) models or other virtual content, to the viewing device 102.

The viewing device 102 can be used by the user 106 to augment the user's reality. The user 106 may be a human user (e.g., a human being), a machine user (e.g., a computer configured by a software program to interact with the viewing device 102), or any suitable combination thereof (e.g., a human assisted by a machine or a machine supervised by a human). The user 106 is not part of the network environment 100, but is associated with the viewing device 102.

The viewing device 102 may be a computing device with a camera and a transparent display, such as a tablet, smartphone, or a wearable computing device (e.g., helmet or glasses). In another example embodiment, the viewing device 102 may be hand held or may be removably mounted to the head of the user 106 (e.g., a head-mounted viewing device). In another example embodiment, the viewing device 102 may be a computing device integrated in a vehicle, such as an automobile, to provide virtual content on a heads up display (HUD).

In one example, the display may be a screen that displays what is captured with a camera of the viewing device 102. In another example, the display of the viewing device 102 may be transparent or partially-transparent, such as in lenses of wearable computing glasses, the visor or a face shield of a helmet, or a windshield of a car. In this type of embodiment, the user 106 may simultaneously view virtual content presented on the display of the viewing device 102 as well as a physical object 104 in the user's 106 line of sight in the real-world physical environment.

The viewing device 102 may provide the user 106 with an augmented reality experience. For example, the viewing device 102 can present virtual content on the display of the viewing device 102 that the user 106 can view in addition to physical objects 104 that are in the line of sight of the user 106 in the real-world physical environment. Virtual content can be any type of image, animation, etc., presented on the display. For example, virtual content can include a virtual model (e.g., 3D model) of an object.

The viewing device 102 can present virtual content on the display to augment a physical object 104. For example, the viewing device 102 can present virtual content to create an illusion to the user 106 that the physical object 104 is changing colors, emitting lights, etc. As another example, the viewing device 102 can present virtual content on a physical object 104 that provides information about the physical object 104, such a presenting a name or a restaurant over the physical location of the restaurant. As another example, the viewing device can present arrows, lines, or other directional indicators over a street to provide the user 106 with directions to a desired destination.

The physical object 104 may include any type of identifiable objects such as a 2D physical object (e.g., a picture), a 3D physical object (e.g., a factory machine, table, cube, building, street, etc.), a location (e.g., at the bottom floor of a factory), or any references (e.g., perceived corners of walls or furniture) in the real-world physical environment.

The viewing device 102 can present virtual content in response to detecting one or more identified objects (e.g., physical object 104) in the physical environment. For example, the viewing device 102 may include optical sensors to capture images of the real-world physical environment and computer vision recognition to identify physical objects 104.

In one example embodiment, the viewing device 102 locally analyzes captured images using a local content dataset or any other dataset previously stored by the viewing device 102. The local content dataset may include a library of virtual content associated with real-world physical objects 104 or references. For example, the local content dataset can include image data depicting real-world physical objects 104, as well as metadata describing the real-world objects. The viewing device 102 can utilize the captured image of a physical object to search the local content dataset to identify the physical object and its corresponding virtual content.

In one example, the viewing device 102 can analyze an image of a physical object 104 to identify feature points of the physical object 104. The viewing device 102 can utilize the identified feature points to identify a corresponding real-world physical object from the local content dataset. The viewing device 102 may also identify tracking data related to the physical object 104 (e.g., GPS location of the viewing device 102, orientation, distance to the physical object 104).

If the captured image is not recognized locally by the viewing device 102, the viewing device 102 can download additional information (e.g., virtual content) corresponding to the captured image, from a database of the server 110 over the network 108.

In another example embodiment, the physical object 104 in the image is tracked and recognized remotely at the server 110 using a remote dataset or any other previously stored dataset of the server 110. The remote content dataset may include a library of virtual content or augmented information associated with real-world physical objects 104 or references. In this type of embodiment, the viewing device 102 can provide the server with the captured image of the physical object 104. The server 110 can use the received image to identify the physical object 104 and its corresponding virtual content. The server 110 can then return the virtual content to the viewing device 102.

The viewing device 102 can present the virtual content on the display of the viewing device 102 to augment the user's 106 reality. For example, the viewing device 102 can present the virtual content on the display of the viewing device 102 to allow the user 106 to simultaneously view the virtual content as well as the real-world physical environment in the line of sight of the user 106.

The viewing device 102 includes an ADAS configured to avoid collisions by implementing safeguards and taking over control of the vehicle. For example, the viewing device 102 utilizes sensor data describing the speed and trajectory of the vehicle as well as the location of physical objects 104 in relation to the vehicle to determine whether the vehicle is in danger of colliding with a physical object 104. In the event that the viewing device 102 determines that the vehicle is in danger of colliding with a physical object 104, the viewing device 102 determines an automated movement of the vehicle to avoid the collision. For example, an automated movement may include adjusting the speed and or trajectory of the vehicle to avoid a collision with the physical object 104. The viewing device 104 executes the automated movement, which causes the speed and/or trajectory of the vehicle to be adjusted accordingly to avoid the collision.

The viewing device 102 alerts users of the automated movement by presenting virtual content on a display of the viewing device (e.g., HUD of the vehicle). For example, the viewing device 102 presents visual indicators (e.g., arrows, lines, etc.) that represent a physical route that will be traversed by the vehicle during the automated movement. As a result, users in the vehicle will be alerted to the automated movement, which may reduce any fear or alarm.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., viewing device 102). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
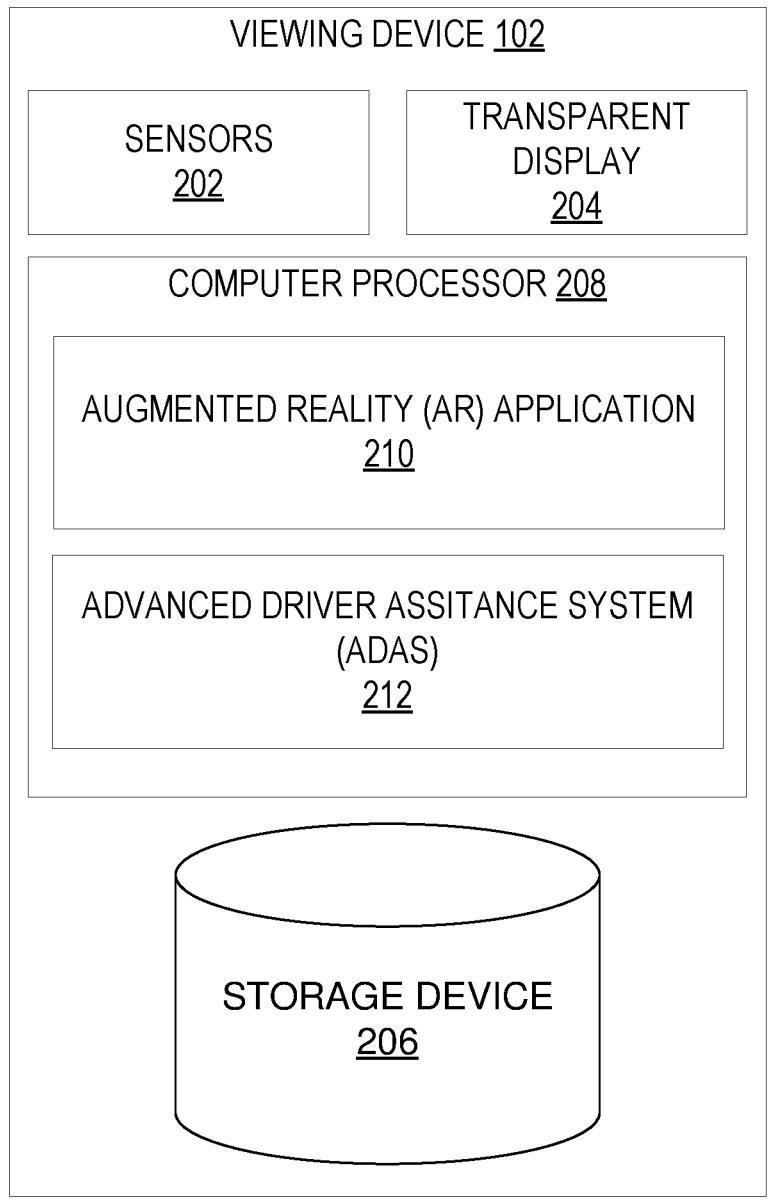
FIG. 2 is a block diagram illustrating an example embodiment of a viewing device, according to some embodiments.

FIG. 2 is a block diagram illustrating an example embodiment of a viewing device 102, according to some embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the viewing device 102 to facilitate additional functionality that is not specifically described herein. Furthermore, the various functional modules depicted in FIG. 2 may reside on a single computing device or may be distributed across several computing devices in various arrangements such as those used in cloud-based architectures.

The viewing device 102 includes sensors 202, a transparent display 204, a computer processor 208, and a storage device 206. The viewing device 102 can be a wearable device, such as a helmet, a visor, or any other device that can be mounted to the head of a user 106. The viewing device 102 may also be a mobile computing device, such as a smartphone or tablet. The viewing device may also be a computing device integrated into a vehicle, such as computing device integrated into an automobile, motorcycle, plane, boat, recreational vehicle (RV), etc.

The sensors 202 include any type of known sensors. For example, the sensors 202 can include a thermometer, one or more infrared camera(s) and projector(s), a barometer, a humidity sensor, a proximity or location sensor (e.g., near field communication, GPS, Bluetooth, Wi-Fi), one or more optical sensor(s) (e.g., camera), an inertial sensor (e.g., gyroscope and/or accelerometer), an audio sensor (e.g., a microphone), or any suitable combination thereof. For example, the sensors 202 may include a rear-facing camera and a front-facing camera in the viewing device 102. As another example, the sensors can include multiple sensors placed at various points of a vehicle that determine a distance of the vehicle to a physical object 104, such as a depth sensor or radar sensor. As another example, the sensors 202 include sensors that describe a speed and/or trajectory of a vehicle, such as speed sensors, speedometer, steering angle sensor, etc. It is noted that the sensors described herein are for illustration purposes and the sensors 202 are thus not limited to the ones described.

The transparent display 204 includes, for example, a display configured to display virtual images generated and rendered by the processor 208. In another example, the transparent display 204 includes a touch-sensitive surface to receive a user input via a contact on the touch-sensitive surface. The transparent display 204 can be positioned such that the user 106 can simultaneously view virtual content presented on the transparent display and a physical object 104 in a line-of-sight of the user 106. For example, the transparent display 204 can be a HUD in an automobile or other vehicle that presents virtual content on a windshield of the vehicle while also allowing a user 106 to view physical objects 104 through the windshield. For example, the HUD can be configured to display virtual images itself or, alternatively, can presented virtual images projected onto the HUD.

The computer processor 208 includes an AR application 210 and an ADAS 212. The AR application 210 is configured to present virtual content on the transparent display 204 to augment the user's 106 reality. The AR application 210 receives sensor data from sensors 202 (e.g., an image of the physical object 104, location data, etc.), and uses the received sensor data to identify a physical object 104 and present virtual content on the transparent display 204.

To identify a physical object 104, the AR application 210 determines whether an image captured by the viewing device 102 matches an image locally stored by the viewing device 102 in the storage device 206. The storage device 206 includes a local content dataset of images and corresponding virtual content. For example, the viewing device 102 receives a content data set from the server 110, and stores the received content data set in the storage device 206.

The AR application 210 compares a captured image of the physical object 104 to the images locally stored in the storage device 206 to identify the physical object 104. For example, the AR application 210 analyzes the captured image of a physical object 104 to identify feature points of the physical object 104. The AR application 210 then utilizes the identified feature points to identify the physical object 104 from the local content dataset.

In some embodiments, the AR application 210 identifies a physical object 104 based on a detected visual reference (e.g., a logo or QR code) on the physical object 104 (e.g., a chair). The visual reference may also be referred to as a marker and may consist of an identifiable image, symbol, letter, number, machine-readable code. For example, the visual reference may include a bar code, a quick response (QR) code, or an image that has been previously associated with the virtual content.

If the AR application 210 cannot identify a matching image from the local content dataset, the AR application 210 provides the captured image of the physical object 104 to the server 110. The server 100 uses the captured image to search a remote content dataset maintained by the server 110.

The remote content dataset maintained by the server 110 is generally larger than the local content dataset maintained by the viewing device 102. For example, the local content dataset maintained by the viewing device 102 can include a subset of the data included in the remote content dataset, such as a core set of images or the most popular images determined by the server 110.

Once the physical object 104 has been identified by either the viewing device 102 or the server 110, the corresponding virtual content is retrieved and presented on the transparent display 204 to augment the user's 106 reality. The AR application 210 presents the virtual content on the transparent display 204 to create an illusion to the user 106 that the virtual content is in the user's real world, rather than virtual content presented on the display. For example, the AR application 210 presents arrows or other directional indicators to create the illusion that the arrows are present on the road in front of the user 106.

To create the illusion that virtual content presented on the transparent display 204 is present in the user's real world environment, the AR application 201 presents the virtual content at a presentation position on the transparent display 204 that corresponds to a physical object 104 in the user's real world environment. A presentation position on the transparent display 204 is a physical position on the display at which the virtual content is presented. The presentation position on the transparent display 204 that corresponds to a physical object 104 indicates a physical position on the transparent display 204 through which the physical object 104 is visible to a user operating the vehicle. As an example, the AR application 210 presents virtual content such as directional arrows at a presentation position corresponding to a road to create the illusion to a user operating the vehicle that the arrows are physically present on the road.

The AR application 210 updates presentation of the virtual content as the vehicle and physical object 104 move to maintain the illusion that the virtual content is present in the user's real world environment. For example, the AR application 210 utilizes sensor data from sensors 202 to monitor movement of the vehicle and the physical object 104. The AR application 210 updates presentation of the virtual content based on the detected movements. For example, the AR application 210 determines an updated presentation position on the transparent display 204 corresponding to the physical object 104 and updates presentation accordingly. As a result, presentation of the virtual content remains consistent in relation to the physical object 104 as the vehicle and/or physical object 104 move through the user's real world environment.

The ADAS 212 is configured to avoid collisions by implementing safeguards and taking over control of the vehicle. For example, the ADAS 212 utilizes sensor data gathered by sensors 202 that describe the speed and trajectory of the vehicle as well as the location of physical objects 104 in relation to the vehicle to determine whether the vehicle is in danger of colliding with a physical object 104. In the event that the ADAS 212 determines that the vehicle is in danger of colliding with a physical object 104, the ADAS 212 determines an automated movement of the vehicle to avoid the collision. For example, an automated movement may include adjusting the speed and or trajectory of the vehicle to avoid a collision with the physical object 104. The ADAS 212 executes the automated movement, which causes the speed and/or trajectory of the vehicle to be adjusted accordingly to avoid the collision.

The AR application 210 alerts users of the automated movement by presenting virtual content on the transparent display 204 of the viewing device 102. For example, the AR application 210 presents visual indicators (e.g., arrows, lines, etc.) that represent a physical route that will be traversed by the vehicle during the automated movement. As a result, users in the vehicle will be alerted to the automated movement, which may reduce any fear or alarm.

The AR application 210 presents the virtual content at a presentation position on the transparent display 204 that corresponds to a physical path of the automated movement. For example, if the automated movement is changing a trajectory of the vehicle to go around a physical object 104 (to be avoided), the AR application 210 presents the virtual content at a presentation position corresponding to the physical path that the vehicle will traverse to go around the physical object 104. Accordingly, the virtual content will overlap with the user operating the vehicles view of the physical path. In other words, the virtual content appears coupled to the physical path on the road. As the virtual content is updated based on updates from ADAS 212. For example, the virtual content displays an updated virtual path corresponding to an updated automated movement.

In another example embodiment, the virtual content includes a first virtual path that displays the automated movement from ADAS 212 and a second virtual path that displays safe area path or area. For example, the first virtual path is displayed in red to indicate that the collision avoidance maneuver. The second virtual path is displayed in green to indicate a safe area or path.

In another example embodiment, the AR application 210 generates virtual content displayed over the physical object 104 to indicate that physical object 104 presents a danger. For example, the AR application 210 generates a red color filter to render the physical object 104 to appear flashing red to the user 106.

The network 108 may be any network that enables communication between or among machines, databases, and devices (e.g., the head-mounted viewing device 102). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
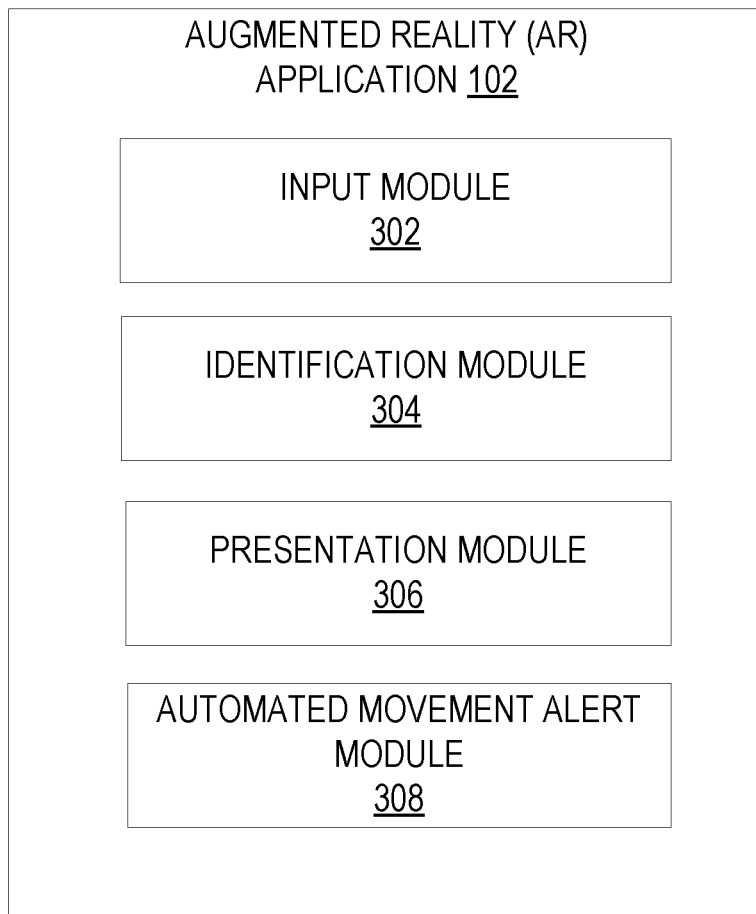
FIG. 3 is a block diagram illustrating an example embodiment of an AR application, according to some embodiments.

FIG. 3 is a block diagram illustrating an example embodiment of an AR application 210, according to some embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by AR application 210 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the AR application 210 includes an input module 302, an identification module 304, a presentation module 306 and an automated alert module 308.

The input module 302 receives sensor data from sensors 202. For example, the input module 302 receives images captured by a camera (e.g., images of a physical object 104), location data describing a physical location of the vehicle, sensor data describing the distance of a physical object from the vehicle, sensor data describing operation of the vehicle (e.g., speed and trajectory), etc. The input module 302 provides the received sensor data to any of the other modules included in the AR application 210.

The identification module 304 can identify a physical object 104 and corresponding virtual content based on an image of the physical object 104 captured by sensors 202 of the viewing device 102. For example, the identification module 304 can determine whether the captured image matches or is similar to an image locally stored by the viewing device 102 in the storage device 206.

The identification module 304 can compare a captured image of the physical object 104 to a local content dataset of images locally stored in the storage device 206 to identify the physical object 104. For example, the identification module 304 can analyze the captured image of a physical object 104 to identify feature points of the physical object. The identification module 304 can utilize the identified feature points to identify the physical object 104 from the local content dataset.

In some embodiments, the identification module 304 can identify a physical object 104 based on a detected visual reference (e.g., a logo or QR code) on the physical object 104 (e.g., a chair). The visual reference may also be referred to as a marker and may consist of an identifiable image, symbol, letter, number, machine-readable code. For example, the visual reference may include a bar code, a quick response (QR) code, or an image that has been previously associated with the virtual content. The local content dataset can include a listing of visual references and corresponding virtual content. The identification module 304 can compare visual references detected in a captured image to the visual references include in the local content dataset.

If the identification module 304 cannot identify a matching image from the local content dataset, the identification module 304 can provide the captured image of the physical object 104 to the server 110 and the server 110 can search a remote content dataset maintained by the server 110.

Once the physical object 104 has been identified, the identification module 304 can access the corresponding virtual content to be presented on the transparent display 204 to augment the user's 106 reality.

The presentation module 306 presents virtual content on the transparent display 204. This includes utilizing sensor data to determine an appropriate presentation position on the transparent display 204, as well as causing presentation of the virtual content at the presentation position of the transparent display 204. To determine the presentation position, the presentation module 306 uses images captured by optical sensors (e.g., cameras) to identify a location of the physical object 104 in relation to the vehicle. For example, the presentation module 306 determines the location of the physical object 104 based on a location of the physical object 104 in the captured image. Locations within an image captured by an optical sensor may be correlated to corresponding presentation positions on the transparent display 204.

Once the presentation module 306 has determined the presentation position, the presentation module 306 presents the virtual content on the transparent display 204 at the presentation position. As a result, the virtual content appears to be present in the user's real world environment, thereby augmenting the user's reality.

The presentation module 306 continuously updates presentation of the virtual content based on detected movements of the vehicle and/or the physical object 104. For example, the presentation module 306 utilizes sensor data to determine movements of the vehicle and/or the physical object 104. The presentation module 306 uses the determined movements to determine an updated location of the physical object 104 in relation to the vehicle and updates presentation of the virtual content accordingly. For example, the presentation module 306 determines an updated presentation position corresponding to the updated location of the physical object 104 in relation to the vehicle. The presentation module 306 then updates presentation of the virtual content on the transparent display 204 based on the updated presentation position. As a result, the virtual content will appear to remain consistent with its corresponding physical object 104 as the vehicle and/or the physical object 104 move.

The automated movement alert module 308 presents virtual content alerting a user to an upcoming automated movement. For example, to prepare a user for an automated movement that changes the speed and or trajectory of the vehicle to avoid a collision, the automated movement alert module 308 presents visual indications (e.g., arrows) indicating an expected physical path of the vehicle during the automated movement. As a result, the user will be aware of the upcoming automated movement, thereby reducing any fear or surprise that the user may experience.

The automated movement alert module 308 receives a communication from the ADAS 212 indicating that an automated movement will be executed. The communication includes data describing the automated movement, such as a change in speed and/or change in trajectory that will be executed. The automated movement alert module 308 utilizes this data to generate virtual content representing the automated movement. For example, the automated movement alert module 308 utilizes sensor data describing a current speed and trajectory of the vehicle and utilizes this data along with the change in speed and/or trajectory of the automated movement to calculate an expected physical path of the vehicle.

The automated movement alert module 308 generates virtual content representing the expected physical path. For example, the virtual content may include lines, arrows, etc., representing the physical path of the vehicle during the automated movement. Additionally, the virtual content may include text or other symbols alerting the user to the upcoming automated movement. For example, the virtual content may include a red stop sign indicating that the automated movement may be reducing speed. As another example, the virtual content may include text stating that the vehicle will turn left or turn right. As another example, the virtual content may include an illustration of a steering wheel turning in the direction of the automated movement.

The automated movement alert module 308 provides the generated virtual content to the presentation module 306. The presentation module 306 then presents the virtual content on the transparent display 204 using the techniques described above. For example, the presentation module 306 uses sensor data to determine a presentation position of the virtual content. Additionally, the presentation module 306 updates presentation of the virtual content based on movements of the vehicle and/or physical object 104.

Figure 4:
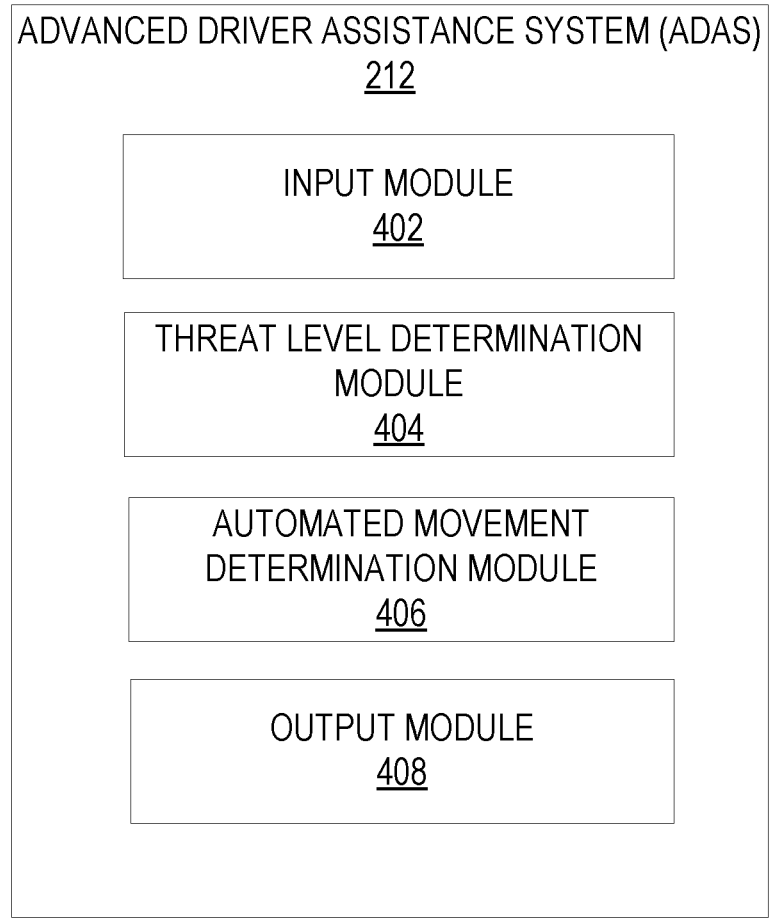
FIG. 4 is a block diagram illustrating an example embodiment of an ASAS, according to some example embodiments.

FIG. 4 is a block diagram illustrating an example embodiment of an ASAS 212, according to some embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the ADAS 212 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the ADAS 212 includes an input module 302, an input module 402, a threat level determination module 404, an automated movement determination module 406, and an output module 408.

The input module 402 receives sensor data from sensors 202. For example, the input module 402 receives images captured by a camera (e.g., images of a physical object 104), location data describing a physical location of the vehicle, sensor data describing the distance of a physical object from the vehicle, sensor data describing operation of the vehicle (e.g., speed and trajectory), etc. The input module 402 provides the received sensor data to any of the other modules included in the ADAS 212.

The threat level determination module 404 determines a threat level of the vehicle colliding with a physical object 104. For example, the threat level determination module 404 utilizes sensor data describing the current speed and trajectory of the vehicle, as well as sensor data describing the geographic location of a physical object 104 in relation to the vehicle. The threat level determination module 404 uses this sensor data to determine a threat level that the vehicle will collide with the physical object 104. The threat level indicates an estimated likelihood that the vehicle will collide with the physical object if an automated movement is not executed.

The threat level determination module 404 utilizes the speed and trajectory of the vehicle, as well as the location of the physical object 104 in relation to the vehicle, to determine a likelihood that the vehicle, at its current trajectory, will collide with the physical object 104. For example, if the physical object 104 is directly in the trajectory of the vehicle, the threat level determination module 404 determines a relatively higher likelihood that the vehicle will collide with the physical object 104. Conversely, if the physical object 104 is outside of the current trajectory of the vehicle, the threat level determination module 404 determines a relatively lower likelihood that the vehicle will collide with the physical object 104.

The threat level determination module 404 further determines an amount of time until a collision would occur based on the speed of the vehicle.

The threat level determination module 404 determines the threat level of the vehicle colliding with the physical object 104 based on the likelihood that the vehicle will collide with the physical object 104 and the amount of time until a potential collision. For example, if the likelihood of the vehicle colliding with the physical object is high and the amount of time until the potential collision is low, the threat level determination module 404 determines a relatively high threat level. In contrast, if the likelihood of the vehicle colliding with the physical object is low and the amount of time until the potential collision is high, the threat level determination module 404 determines a relatively low threat level.

The threat level determination module 404 compared the determined threat level to a threshold threat level for executing an automated movement to avoid colliding with the physical object 104. If the threat level is below the threshold threat level, the ADAS 112 does not execute an automated movement. Alternatively, if the threat level meets or exceeds the threshold threat level, the ADAS 112 executes an automated movement to avoid colliding with the physical object 104.

The automated movement determination module 406 determines an automated movement to avoid colliding with a physical object 104. For example, the automated movement determination module 406 utilizes sensor data, including the vehicles trajectory and speed, the location of the physical object 104, as well as the location of other physical objects 104 in the user's real world environment, to determine an automated movement to avoid colliding with the physical object 104. For example, the automated movement determination module 406 may determine a change in speed and trajectory of the vehicle to avoid the collision.

The output module 408 transmits a communication to the AR application 102 indicating that an automated movement will be executed. The communication includes data describing the automated movement, such as a change in speed and/or change in trajectory that will be executed. The output module 408 further causes the vehicle to execute the automated movement. This includes executing a change in speed and/or trajectory to avoid collision with the physical object 104.

Figure 5:
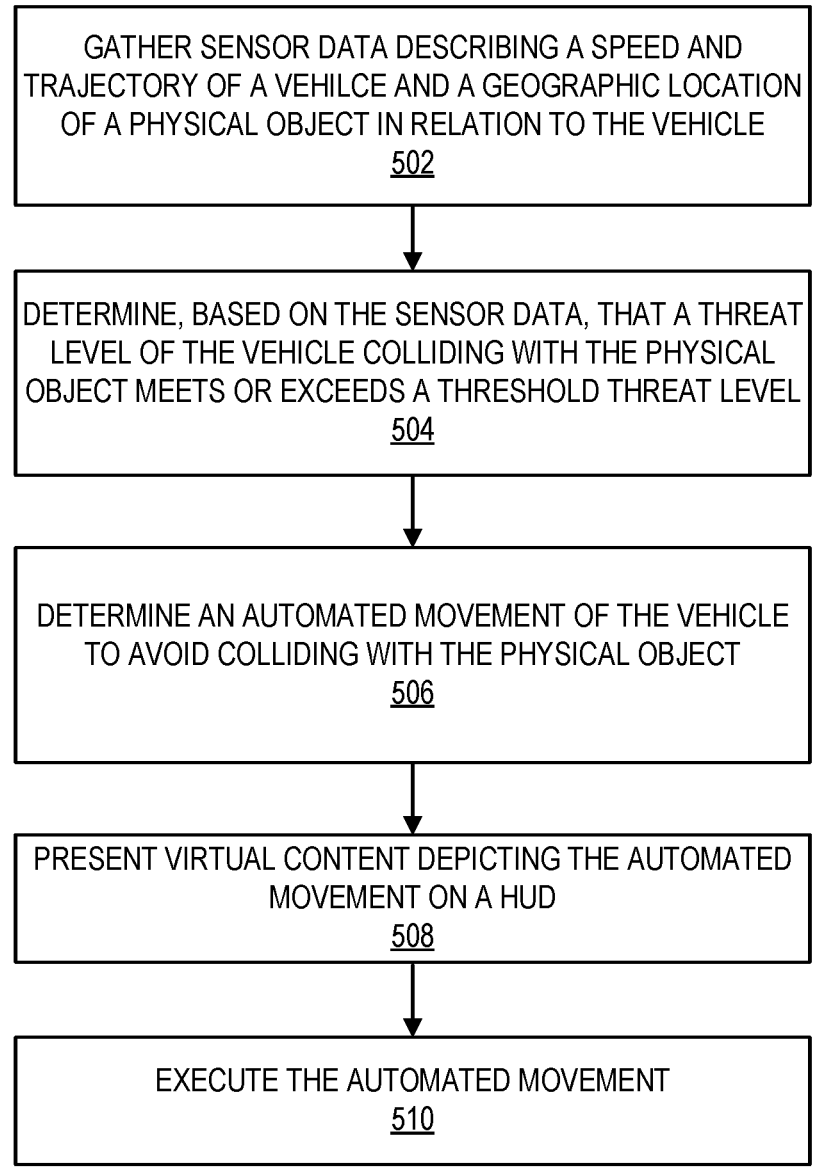
FIG. 5 is an example method for presenting an AR visualization of an ADAS, according to some example embodiments.

FIG. 5 is an example method 500 for presenting an AR visualization of an ADAS, according to some example embodiments. The method 500 may be embodied in computer readable instructions for execution by one or more processors such that the operations of the method 500 may be performed in part or in whole by the AR application 210 and the ADAS 212; accordingly, the method 500 is described below by way of example with reference thereto. However, it shall be appreciated that at least some of the operations of the method 500 may be deployed on various other hardware configurations and the method 500 is not intended to be limited to the AR application 210 and the ADAS 212.

At operation 502, the input module 402 gathers sensor data describing a speed and trajectory of the vehicle and a geographic location of a physical object 104 in relation to the vehicle. For example, the sensor data includes data collected from sensors such as speed sensors, speedometer, steering angle sensor, etc., that describe the speed and trajectory of the vehicle. The sensor data also includes data from sensors that describe the distance and direction of a physical object 104 from the vehicle, such as images captured by optical sensors and proximity data gathered by proximity sensors.

At operation 504, the threat level determination module 404 determines, based on the sensor data, that a threat level of the vehicle colliding with the physical object 104 meets or exceeds a threshold threat level. The threat level indicates an estimated likelihood that the vehicle will collide with the physical object 104 if an automated movement is not executed.

At operation 506, the automated movement determination module 406 determines an automated movement of the vehicle to avoid colliding with the physical object 104. For example, the automated movement can include adjusting a speed and/or trajectory of the vehicle to avoid colliding with the physical object 104.

At operation 508, the AR application 102 presents virtual content depicting the automated movement on the HUD. The virtual content is presented such that the virtual content partially overlaps with a physical path of the automated movement to a user operating the vehicle. The virtual content may include visual markers identifying a pay that the vehicle will traverse to navigate around the physical object 104 and/or visual markers indicating that the speed of the vehicle will be adjusted.

At operation 510, the output module 408 executes the automated movement. This includes causing the vehicle to adjust its trajectory and/or speed to avoid colliding with the physical object 104.

Figure 6:
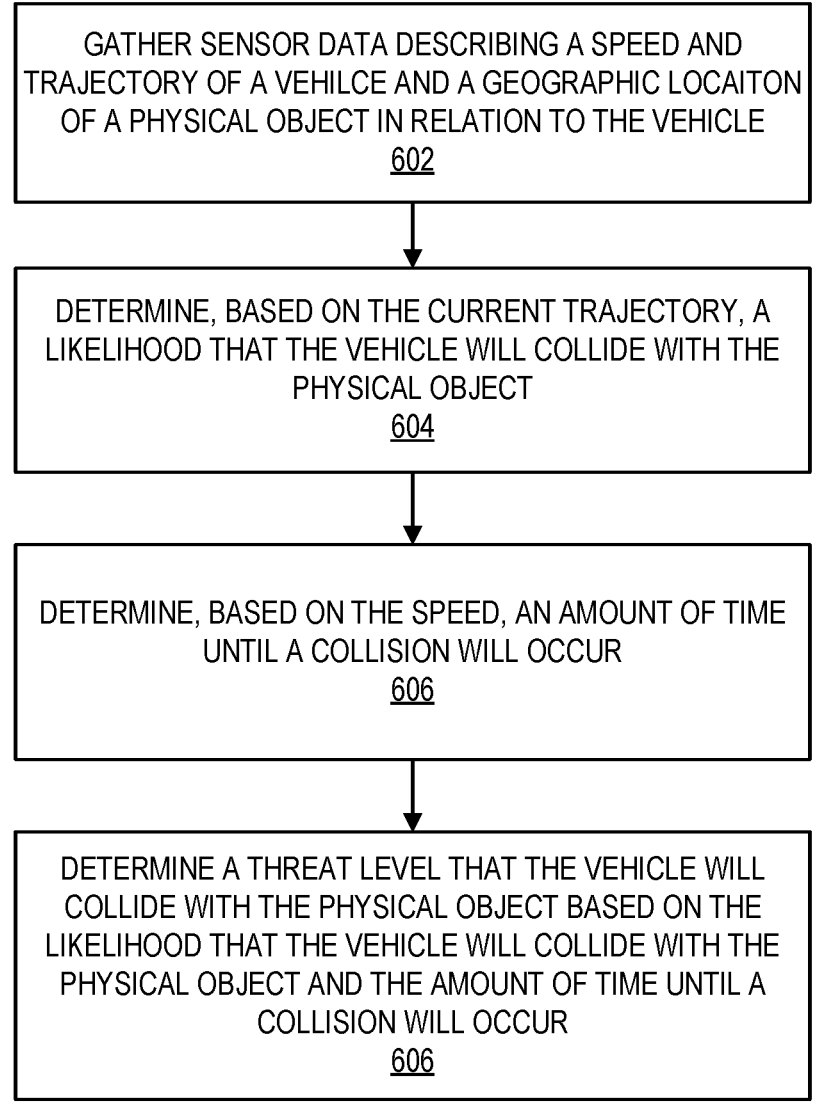
FIG. 6 is an example method for determining a threat level of a vehicle colliding with a physical object, according to some example embodiments.

FIG. 6 is an example method 600 for determining a threat level of a vehicle colliding with a physical object 104, according to some example embodiments. The method 600 may be embodied in computer readable instructions for execution by one or more processors such that the operations of the method 600 may be performed in part or in whole by the ADAS 212; accordingly, the method 600 is described below by way of example with reference thereto. However, it shall be appreciated that at least some of the operations of the method 600 may be deployed on various other hardware configurations and the method 600 is not intended to be limited to the ADAS 212.

At operation 602, the input module 402 gathers sensor data describing a speed and trajectory of the vehicle and a geographic location of a physical object in relation to the vehicle. For example, the sensor data includes data collected from sensors such as speed sensors, speedometer, steering angle sensor, etc., that describe the speed and trajectory of the vehicle. The sensor data also includes data from sensors that describe the distance and direction of a physical object 104 from the vehicle, such as images captured by optical sensors and proximity data gathered by proximity sensors.

At operation 604, the threat level determination module 404 determines, based on the current trajectory, a likelihood that the vehicle will collide with the physical object. For example, if the physical object 104 is directly in the trajectory of the vehicle, the threat level determination module 404 determines a relatively higher likelihood that the vehicle will collide with the physical object 104. Conversely, if the physical object 104 is outside of the current trajectory of the vehicle, the threat level determination module 404 determines a relatively lower likelihood that the vehicle will collide with the physical object 104

At operation 606, the threat level determination module 404 determines, based on the speed, an amount of time until a collision will occur.

At operation 608, the threat level determination module 404 determines a threat level that the vehicle will collide with the physical object based on the likelihood that the vehicle will collide with the physical object and the amount of time until a collision will occur. For example, if the likelihood of the vehicle colliding with the physical object is high and the amount of time until the potential collision is low, the threat level determination module 404 determines a relatively high threat level. In contrast, if the likelihood of the vehicle colliding with the physical object is low and the amount of time until the potential collision is high, the threat level determination module 404 determines a relatively low threat level.

Figure 7:
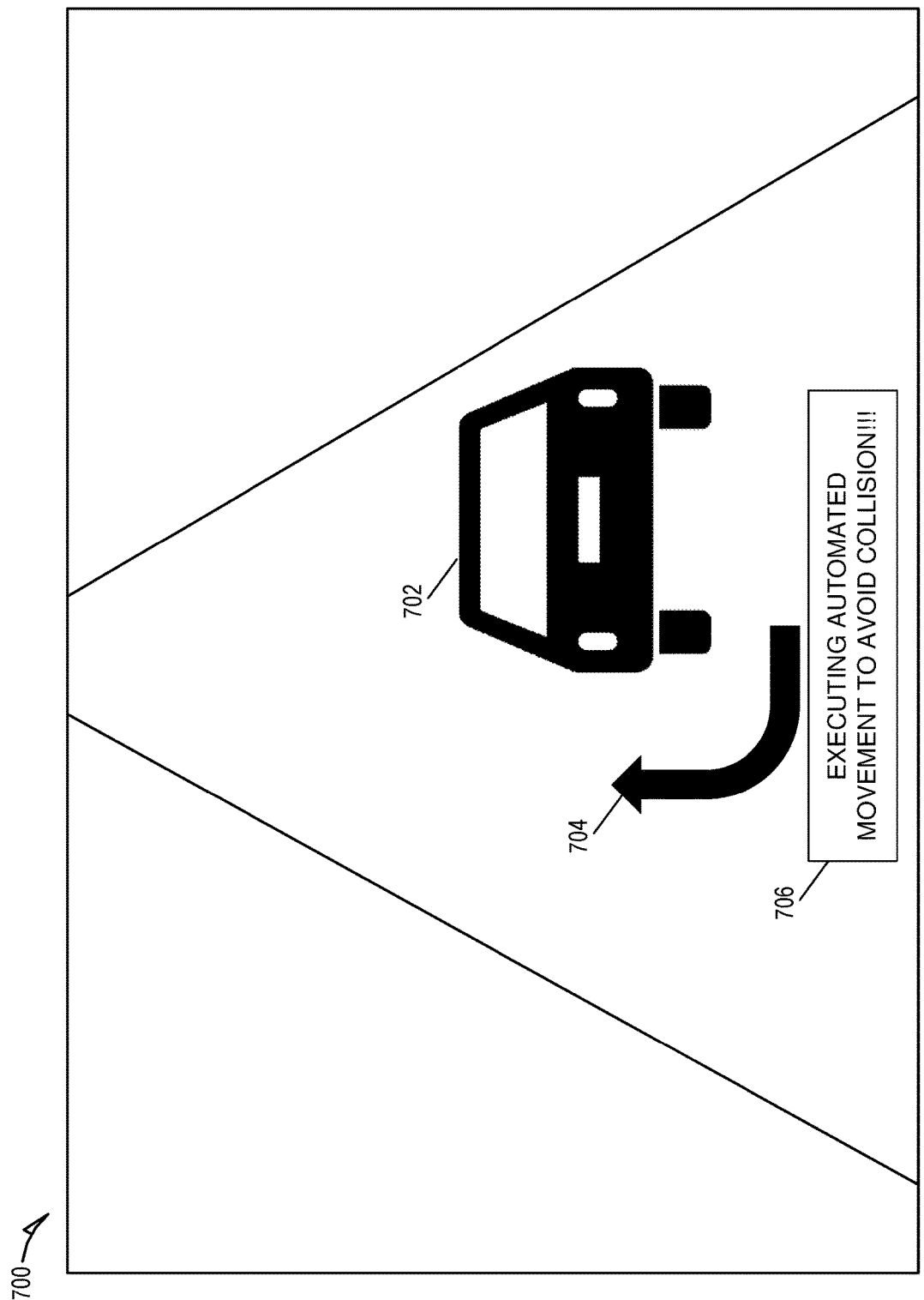
FIG. 7 is a screenshot of a HUD presenting virtual content depicting an automated movement, according to some embodiments.

FIG. 7 is a screenshot of a HUD 700 presenting virtual content depicting an automated movement, according to some embodiments. The HUD 700 is a windshield of a vehicle being operated by a user. As shown, a second vehicle 702 is visible through the HUD 700. A visual marker 704 is presented to alert the user of an automated movement to change a trajectory of the vehicle to avoid colliding with the second vehicle 702. The visual marker 704 shows a physical path that the vehicle will traverse as the automated movement is executed. As indicated by the visual marker 704, the automated movement will cause the vehicle to swerve to the left to avoid colliding with the second vehicle 702. Further, an alert notification 706 is presented to further alert the user that the automated movement will be executed to avoid colliding with the second vehicle 702.

Figure 8:
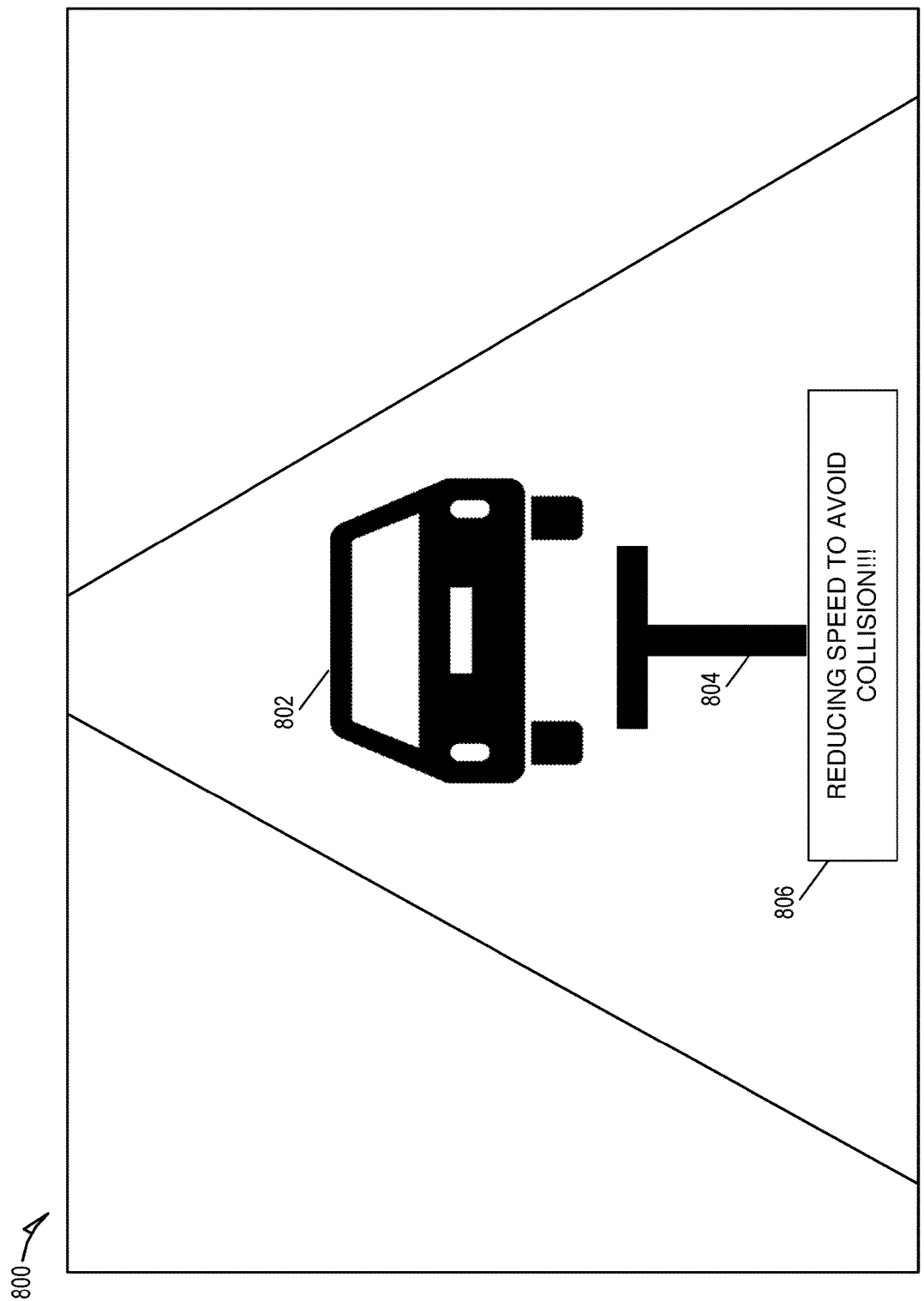
FIG. 8 is another screenshot of a HUD presenting virtual content depicting an automated movement, according to some embodiments.

FIG. 8 is another screenshot 800 of a HUD 800 presenting virtual content depicting an automated movement, according to some embodiments, according to some embodiments. The HUD 800 is a windshield of a vehicle being operated by a user. As shown, a second vehicle 802 is visible through the HUD 800. A visual marker 804 is presented to alert the user of an automated movement to change a trajectory of the vehicle to avoid colliding with the second vehicle 802. The visual marker 804 shows a physical path that the vehicle will traverse as the automated movement is executed. As indicated by the visual marker 804, the automated movement will cause the vehicle to reduce speed to avoid colliding with the second vehicle 802. Further, an alert notification 806 is presented to further alert the user that the speed will be reduced to avoid colliding with the second vehicle 802.

EXAMPLES

Examples can include subject matter such as a method, means for performing acts of the method, at least one machine-readable medium including instructions that, when performed by a machine cause the machine to performs acts of the method, or of an apparatus or system for entity-based routing in a network and between data centers, according to embodiments and examples described herein.

Example 1 is a method comprising: gathering, by a viewing device integrated into a vehicle, sensor data from one or more sensors, the sensor data describing a speed and trajectory of the vehicle and a geographic location of a physical object in relation to the vehicle; determining, based on the sensor data, that a threat level of the vehicle colliding with the physical object meets or exceeds a threshold threat level; in response to determining that the threat level of the vehicle colliding with the physical object meets or exceeds the threshold threat level, determining an automated movement of the vehicle to avoid colliding with the physical object; presenting, on a heads up display of the vehicle, virtual content depicting the automated movement; and executing the automated movement.

In Example 2, the subject matter of Example 1 optionally includes wherein the virtual content is presented on the heads up display such that the virtual content partially overlaps with a physical path of the automated movement to a user operating the vehicle.

In Example 3, the subject matter of any one or more of Examples 1-2 optionally includes wherein the automated movement comprises adjusting the trajectory of the vehicle to navigate the vehicle around the physical object.

In Example 4, the subject matter of any one or more of Examples 1-3 optionally includes wherein the virtual content depicting the automated movement comprises visual markers identifying a path that the vehicle will traverse to navigate around the physical object.

In Example 5, the subject matter of any one or more of Examples 1-4 optionally includes wherein the virtual content depicting the automated movement is presented at least partially prior to execution of the automated movement.

In Example 6, the subject matter of any one or more of Examples 1-5 optionally includes wherein the automated movement comprises adjusting the speed of the vehicle to avoid colliding with the physical object and the virtual content depicting the automated movement comprises visual markers indicating that the speed of the vehicle will be adjusted.

In Example 7, the subject matter of any one or more of Examples 1-6 optionally includes determining, based on the sensor data, the threat level of the vehicle colliding with the physical object.

Example 8 is a viewing device integrated into a vehicle, the viewing device comprising: one or more computer processors; and one or more computer-readable mediums storing instructions that, when executed by the one or more computer processors, cause the viewing device to perform operations comprising: gathering sensor data from one or more sensors, the sensor data describing a speed and trajectory of the vehicle and a geographic location of a physical object in relation to the vehicle; determining, based on the sensor data, that a threat level of the vehicle colliding with the physical object meets or exceeds a threshold threat level; in response to determining that the threat level of the vehicle colliding with the physical object meets or exceeds the threshold threat level, determining an automated movement of the vehicle to avoid colliding with the physical object; presenting, on a heads up display of the vehicle, virtual content depicting the automated movement; and executing the automated movement.

In Example 9, the subject matter of Example 8 optionally includes wherein the virtual content is presented on the heads up display such that the virtual content partially overlaps with a physical path of the automated movement to a user operating the vehicle.

In Example 10, the subject matter of any one or more of Examples 8-9 optionally includes wherein the automated movement comprises adjusting the trajectory of the vehicle to navigate the vehicle around the physical object.

In Example 11, the subject matter of any one or more of Examples 8-10 optionally includes wherein the virtual content depicting the automated movement comprises visual markers identifying a path that the vehicle will traverse to navigate around the physical object.

In Example 12, the subject matter of any one or more of Examples 8-11 optionally includes wherein the virtual content depicting the automated movement is presented at least partially prior to execution of the automated movement.

In Example 13, the subject matter of any one or more of Examples 8-12 optionally includes wherein the automated movement comprises adjusting the speed of the vehicle to avoid colliding with the physical object and the virtual content depicting the automated movement comprises visual markers indicating that the speed of the vehicle will be adjusted.

In Example 14, the subject matter of any one or more of Examples 8-13 optionally includes determining, based on the sensor data, the threat level of the vehicle colliding with the physical object.

Example 15 is non-transitory computer-readable medium storing instructions that, when executed by one or more computer processors of a viewing device integrated into a vehicle, cause the viewing device to perform operations comprising: gathering sensor data from one or more sensors, the sensor data describing a speed and trajectory of the vehicle and a geographic location of a physical object in relation to the vehicle; determining, based on the sensor data, that a threat level of the vehicle colliding with the physical object meets or exceeds a threshold threat level; in response to determining that the threat level of the vehicle colliding with the physical object meets or exceeds the threshold threat level, determining an automated movement of the vehicle to avoid colliding with the physical object; presenting, on a heads up display of the vehicle, virtual content depicting the automated movement; and executing the automated movement.

In Example 16, the subject matter of Example 15 optionally includes wherein the virtual content is presented on the heads up display such that the virtual content partially overlaps with a physical path of the automated movement to a user operating the vehicle.

In Example 17, the subject matter of any one or more of Examples 15-16 optionally includes wherein the automated movement comprises adjusting the trajectory of the vehicle to navigate the vehicle around the physical object.

In Example 18, the subject matter of any one or more of Examples 15-17 optionally includes wherein the virtual content depicting the automated movement comprises visual markers identifying a path that the vehicle will traverse to navigate around the physical object.

In Example 19, the subject matter of any one or more of Examples 15-18 optionally includes wherein the virtual content depicting the automated movement is presented at least partially prior to execution of the automated movement.

In Example 20, the subject matter of any one or more of Examples 15-19 optionally includes wherein the automated movement comprises adjusting the speed of the vehicle to avoid colliding with the physical object and the virtual content depicting the automated movement comprises visual markers indicating that the speed of the vehicle will be adjusted.

Figure 9:
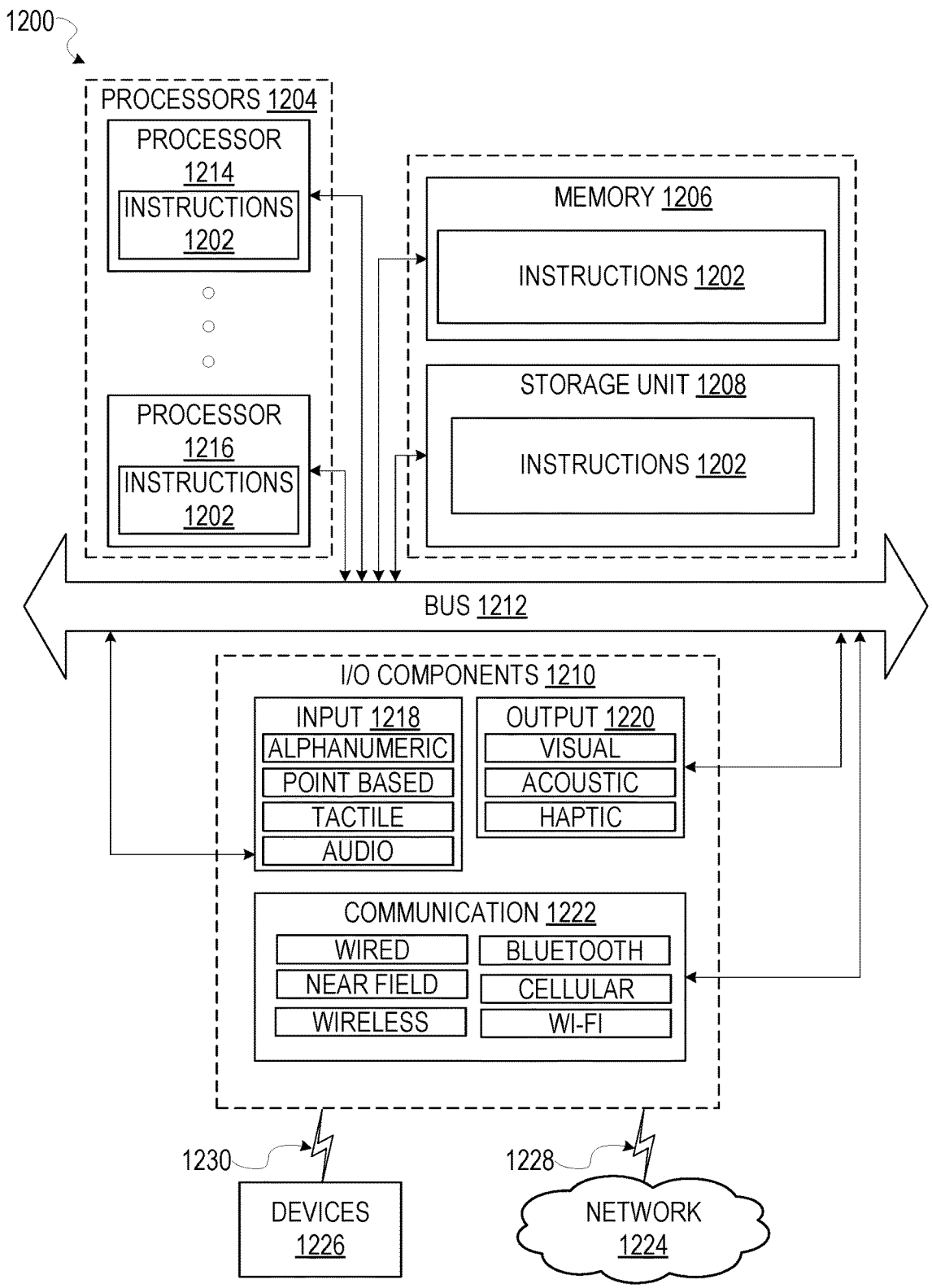
FIG. 9 is a diagrammatic representation of a computing device in the example form of a computer system within which a set of instructions for causing the computing device to perform any one or more of the methodologies discussed herein may be executed.

FIG. 9 is a block diagram illustrating components of a computing device 900, according to some example embodiments, able to read instructions from a machine-readable medium (e.g., a machine-readable storage medium) and perform any one or more of the methodologies discussed herein. Specifically, FIG. 9 shows a diagrammatic representation of computing device 900 in the example form of a system, within which instructions 902 (e.g., software, a program, an application, an applet, an app, a driver, or other executable code) for causing computing device 900 to perform any one or more of the methodologies discussed herein may be executed. For example, instructions 902 include executable code that causes computing device 900 to execute methods 500 and 600. In this way, these instructions transform the general, non-programmed machine into a particular machine programmed to carry out the described and illustrated functions in the manner described herein. Computing device 900 may operate as a standalone device or may be coupled (e.g., networked) to other machines.

By way of non-limiting example, computing device 900 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing instructions 902, sequentially or otherwise, that specify actions to be taken by computing device 900. Further, while only a single computing device 900 is illustrated, the term "machine" shall also be taken to include a collection of computing devices 900 that individually or jointly execute instructions 902 to perform any one or more of the methodologies discussed herein.

Computing device 900 may include processors 904, memory 906, storage unit 908 and I/O components 910, which may be configured to communicate with each other such as via bus 912. In an example embodiment, processors 904 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 914 and processor 916 that may execute instructions 902. The term "processor" is intended to include multi-core processors that may comprise two or more independent processors (sometimes referred to as "cores") that may execute instructions contemporaneously. Although FIG. 9 shows multiple processors, computing device 900 may include a single processor with a single core, a single processor with multiple cores (e.g., a multi-core process), multiple processors with a single core, multiple processors with multiples cores, or any combination thereof.

Memory 906 (e.g., a main memory or other memory storage) and storage unit 908 are both accessible to processors 904 such as via bus 912. Memory 906 and storage unit 908 store instructions 902 embodying any one or more of the methodologies or functions described herein. In some embodiments, database 916 resides on storage unit 908. Instructions 902 may also reside, completely or partially, within memory 906, within storage unit 908, within at least one of processors 904 (e.g., within the processor's cache memory), or any suitable combination thereof, during execution thereof by computing device 900. Accordingly, memory 906, storage unit 908, and the memory of processors 904 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 902. The term "machine-readable medium" shall also be taken to include any medium, or combination of multiple media, that is capable of storing instructions (e.g., instructions 902) for execution by a machine (e.g., computing device 900), such that the instructions, when executed by one or more processors of computing device 900 (e.g., processors 904), cause computing device 900 to perform any one or more of the methodologies described herein (e.g., methods 500 and 600). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 910 may include a wide variety of components to receive input, provide output, produce output, transmit information, exchange information, capture measurements, and so on. The specific I/O components 910 that are included in a particular machine will depend on the type of machine. For example, portable machines such as mobile phones will likely include a touch input device or other such input mechanisms, while a headless server machine will likely not include such a touch input device. It will be appreciated that I/O components 910 may include many other components that are not specifically shown in FIG. 9. I/O components 910 are grouped according to functionality merely for simplifying the following discussion and the grouping is in no way limiting. In various example embodiments, I/O components 910 may include input components 918 and output components 920. Input components 918 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. Output components 920 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. I/O components 910 may include communication components 922 operable to couple computing device 900 to network 924 or devices 926 via coupling 928 and coupling 930, respectively. For example, communication components 922 may include a network interface component or other suitable device to interface with network 924. In further examples, communication components 922 may include wired communication components, wireless communication components, cellular communication components, near field communication (NFC) components, Bluetooth® components (e.g., Bluetooth® Low Energy), WiFi® components, and other communication components to provide communication via other modalities. The devices 926 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
   gathering, by a viewing device integrated into a vehicle being driven by a human user, sensor data from one or more sensors, the sensor data describing a speed and trajectory of the vehicle and a geographic location of a physical object in relation to the vehicle;
   determining, based on the sensor data, that a threat level of the vehicle colliding with the physical object meets or exceeds a threshold threat level;
   in response to determining that the threat level of the vehicle colliding with the physical object meets or exceeds the threshold threat level, determining an automated movement of the vehicle to avoid colliding with the physical object without further input from the user;
   prior to executing the automated movement, initiating presentation of virtual content to the user depicting the automated movement on a heads up display of the vehicle; and
   after initiating the presentation of the virtual content depicting the automated movement on the heads up display of the vehicle, automatically transferring driving control from the user of the vehicle and automatically executing the automated movement without further input from the user of the vehicle after initiation of the presentation.

2. The method of claim 1, wherein the virtual content is presented on the heads up display such that the virtual content partially overlaps with a physical path of the automated movement to a user operating the vehicle.

3. The method of claim 1, wherein the automated movement comprises adjusting the trajectory of the vehicle to navigate the vehicle around the physical object.

4. The method of claim 3, wherein the virtual content depicting the automated movement comprises visual markers identifying a path that the vehicle will traverse to navigate around the physical object.

5. The method of claim 1, wherein the automated movement comprises adjusting the speed of the vehicle to avoid colliding with the physical object and the virtual content depicting the automated movement comprises visual markers indicating that the speed of the vehicle will be adjusted.

6. The method of claim 1, further comprising:
   determining, based on the sensor data, the threat level of the vehicle colliding with the physical object.

7. A viewing device integrated into a vehicle, the viewing device comprising:
   one or more computer processors; and
   one or more computer-readable mediums storing instructions that, when executed by the one or more computer processors, cause the viewing device to perform operations comprising:
   gathering sensor data from one or more sensors, the sensor data describing a speed and trajectory of the vehicle and a geographic location of a physical object in relation to the vehicle as the vehicle is being driven by a human user;
   determining, based on the sensor data, that a threat level of the vehicle colliding with the physical object meets or exceeds a threshold threat level;
   in response to determining that the threat level of the vehicle colliding with the physical object meets or exceeds the threshold threat level, determining an automated movement of the vehicle to avoid colliding with the physical object without further input from the user;
   prior to executing the automated movement, initiating presentation of virtual content to the user depicting the automated movement on a heads up display of the vehicle; and
   after initiating the presentation of the virtual content depicting the automated movement on the heads up display of the vehicle, automatically transferring driving control from the user of the vehicle and automatically executing the automated movement without further input from the user of the vehicle after initiation of the presentation.

8. The viewing device of claim 7, wherein the virtual content is presented on the heads up display such that the virtual content partially overlaps with a physical path of the automated movement to a user operating the vehicle.

9. The viewing device of claim 7, wherein the automated movement comprises adjusting the trajectory of the vehicle to navigate the vehicle around the physical object.

10. The viewing device of claim 9, wherein the virtual content depicting the automated movement comprises visual markers identifying a path that the vehicle will traverse to navigate around the physical object.

11. The viewing device of claim 7, wherein the automated movement comprises adjusting the speed of the vehicle to avoid colliding with the physical object and the virtual content depicting the automated movement comprises visual markers indicating that the speed of the vehicle will be adjusted.

12. The viewing device of claim 7, the operations further comprising:
  determining, based on the sensor data, the threat level of the vehicle colliding with the physical object.

13. A non-transitory computer-readable medium storing instructions that, when executed by one or more computer processors of a viewing device integrated into a vehicle being driven by a human user, cause the viewing device to perform operations comprising:
  gathering sensor data from one or more sensors, the sensor data describing a speed and trajectory of the vehicle and a geographic location of a physical object in relation to the vehicle;
  determining, based on the sensor data, that a threat level of the vehicle colliding with the physical object meets or exceeds a threshold threat level;
  in response to determining that the threat level of the vehicle colliding with the physical object meets or exceeds the threshold threat level, determining an automated movement of the vehicle to avoid colliding with the physical object without further input from the user;
  prior to executing the automated movement, initiating presentation of virtual content to the user depicting the automated movement on a heads up display of the vehicle; and
  after initiating the presentation of the virtual content depicting the automated movement on the heads up display of the vehicle, automatically transferring driving control from the user of the vehicle and automatically executing the automated movement without further input from the user of the vehicle after initiation of the presentation.

14. The non-transitory computer-readable medium of claim 13, wherein the virtual content is presented on the heads up display such that the virtual content partially overlaps with a physical path of the automated movement to a user operating the vehicle.

15. The non-transitory computer-readable medium of claim 13, wherein the automated movement comprises adjusting the trajectory of the vehicle to navigate the vehicle around the physical object.

16. The non-transitory computer-readable medium of claim 15, wherein the virtual content depicting the automated movement comprises visual markers identifying a path that the vehicle will traverse to navigate around the physical object.

17. The non-transitory computer-readable medium of claim 13, wherein the automated movement comprises adjusting the speed of the vehicle to avoid colliding with the physical object and the virtual content depicting the automated movement comprises visual markers indicating that the speed of the vehicle will be adjusted.

* * * * *